(12) United States Patent
Michaud et al.

(10) Patent No.: US 8,675,854 B2
(45) Date of Patent: Mar. 18, 2014

(54) MULTI-MODAL COMMUNICATIONS WITH CONFERENCING AND CLIENTS

(75) Inventors: Alain Michaud, Kanata (CA); Trung (Tim) Trinh, Nepean (CA); Tom Gray, Mansfield (CA)

(73) Assignee: Mitel Networks Corporation, Ottawa, Ontario (CA)

(*) Notice: Subject to any disclaimer, the term of this patent is extended or adjusted under 35 U.S.C. 154(b) by 2 days.

(21) Appl. No.: 13/506,609

(22) Filed: May 1, 2012

(65) Prior Publication Data

US 2013/0294595 A1   Nov. 7, 2013

(51) Int. Cl.
| | |
|---|---|
| H04M 3/56 | (2006.01) |
| H04N 7/15 | (2006.01) |
| H04L 12/18 | (2006.01) |
| H04W 4/14 | (2009.01) |
| G10L 15/26 | (2006.01) |
| G10L 13/08 | (2013.01) |
| G06F 15/16 | (2006.01) |

(52) U.S. Cl.
USPC .............. 379/202.01; 348/14.08; 370/260; 370/261; 379/93.21; 455/416; 455/466; 704/235; 704/260; 704/E13.001; 709/206; 709/207

(58) Field of Classification Search
USPC ............ 379/202.01–206.01, 93.21, 158; 348/14.08–14.1; 370/260–270; 455/416, 466; 704/235, 260, E13.001; 709/204–207
See application file for complete search history.

(56) References Cited

U.S. PATENT DOCUMENTS

| | | | |
|---|---|---|---|
| 6,816,468 B1* | 11/2004 | Cruickshank | ................ 370/260 |
| 2005/0021344 A1 | 1/2005 | Davis et al. | |
| 2005/0232166 A1* | 10/2005 | Nierhaus | ....................... 370/260 |
| 2009/0003576 A1 | 1/2009 | Singh et al. | |
| 2011/0267419 A1* | 11/2011 | Quinn et al. | ............... 348/14.08 |

FOREIGN PATENT DOCUMENTS

WO   WO 2005/107157 A1   11/2005

* cited by examiner

*Primary Examiner* — Harry Hong

(57) ABSTRACT

A system and method for merging multi-modal communications are disclosed. The multi-modal communications can be synchronous, asynchronous and semi-synchronous. By way of a non-limiting example, at least two devices operating with varied modalities can be connected to a conferencing appliance. The conferencing appliance can integrate the differing modalities from the at least two devices by executing at least one of turn taking, conference identification, participant identification, ordering of interjections, modulation of meaning, expectation of shared awareness, floor domination and combination thereof.

20 Claims, 9 Drawing Sheets

MULTI-MODAL COMMUNICATIONS WITH CONFERENCING AND CLIENTS

TECHNICAL FIELD

This disclosure generally relates to communication and collaboration systems, and more particularly, to a conferencing system that merges various communications having different modalities.

BACKGROUND

There are many human situations and roles in which conferencing and collaboration takes place. For example, medical researchers use such a conference to jointly discuss ongoing work. Lawyers negotiating and/or discussing the progress of a case also use such technology. Conferences can be supplied by providers of social media services, on the web and elsewhere, to participants in ad hoc and other types of groups. As will be shown, any grouping of humans, ad hoc or otherwise who wish to communicate in a multi-modal manner can be served by the collaboration systems of this disclosure and it is not limited to any specific class or classes of users. The disclosure will be described below in terms of its use by managers and others in the environment. This is used as a non-limiting example and is not intended to limit the applicability of the technology to that class of participant.

It is well known that managers and other workers in an organization must attend to multiple priorities contemporaneously. They have many responsibilities that, of necessity, compete for their attention. It is one of the primary tasks of managers to partition and fairly share their attention across these conflicting responsibilities. As a result of this, it is common for managers to multi-task. A common example of this is a case in which a manager is participating in a conference call and at the same time reading emails and quickly dealing with people who enter their office. Managers must quickly shift their attention back and forth while at the same time maintaining their knowledge of the state of each of their individual tasks.

Various modalities of collaboration lend themselves to differing requirements for the degree of attention. Applications with a modality for interactions mediated, for example by text, lend itself to an intermittent and more limited degree of attention. A manager gives most of their attention to an audio conference while still being able to quickly and briefly attend to email text messages during lulls in the audio conference. However to deal with a face-to-face interaction with a quick visitor to their office will require the manager's full attention. Their current awareness to the conference call can be lost and, as a result, the manager can lose their place in it. This can be disruptive to the conference as the manager attempts to restore their knowledge of the current state of the conference and can lead to inefficiency.

A solution that will allow the manager to adjust the level of attention that they can place in a conference call while still retaining a connection to it would be useful, and is the context of the present disclosure. That is, it will be useful to provide the manager with the ability to be involved in conferences with a modality greater than they can provide at a specific time. This can arise, as described above, by the manager balancing multiple priorities at the same time and so multi-tasking between multiple conferences. As well, it can arise because the manager at any specific time can be able to connect to a conference through a device which has the capability of supporting a lower degree of interaction that required by the modality of the conference in which they wish to participate. So, for example, a manager can wish to connect to an audio conference through a device that is capable only of a text modality such as, for example, through an IM interface.

It should be pointed out that to produce a useful multi-modal conference system goes beyond the well-known concept of media transcoding. It is not sufficient to convert from one media to another. Thus, for example, the use of a text-to-speech (TTS) converter to transcode between text and voice is not sufficient in moving between a semi-synchronous and a synchronous conference. Useful interactions within a conference are enabled by expectations that participants will conform to certain practices or behaviors that work together to allow a coherent and focused discussion or conversation. Media transcoding without taking into account such expectations as, for example, turn taking, floor domination and other required expectations (described in detail below) will inhibit and possibly make the synchronous discussion impossible. If an incoming IM is converted to voice and then placed into the voice medium of a synchronous conference without consideration for the current speaker then discussion will become very difficult. A practical multi-modal conferencing system must provide mechanisms that will enable the various expectations of the conferences of differing modalities that are being merged.

Managers or other classes of human participants can effectively utilize the system that will allow the effective interaction in conferences through devices of different types of modality. This can be due to the degree of attention that the manager or other type of human participant can provide or due to limitations of the device that the manager is using. The system provided must allow for effective interactions within a conference and at the same time allow participants to interact in conferences with devices of various modalities. Participants can select the modality that best suits their current circumstance but still have the capability of effective interaction in a conference.

The objectives of this disclosure are to allow the linking of devices of multiple modalities in the service of a conference. That is, the disclosure will describe how the mechanisms required produce a useful conference or collaboration and how they can be linked across representations of the conference in two or more modalities. This will have two potential benefits. Firstly, it allows managers or other classes of human participant to attend to a conference in a modality that is suited to the level of attention that they can provide and to the limitations of the device which they are using. Secondly, it allows a manager or other type of human participant to participate in and/or review a conference in multiple modalities. Each modality has strengths and weakness in promoting useful interactions, understanding etc. Having representations of a single conference in two or more modalities allows managers to chose momentarily the modality which is best suited to their particular needs at any one time. Additional features will become apparent from the description provided below.

BRIEF DESCRIPTION OF DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein:

DESCRIPTION OF THE DISCLOSURE

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

Generally described, the present disclosure is concerned with the provision of multi-modal conferencing in communication and collaboration systems. More particularly, the disclosure provides a system and method where at least two devices operating with varied modalities can be connected to a conferencing appliance. The conferencing appliance can integrate the differing modalities from the at least two devices by executing at least one of turn taking, conference identification, participant identification, ordering of interjections, modulation of meaning, expectation of shared awareness, floor domination and combination thereof.

Figure 1:
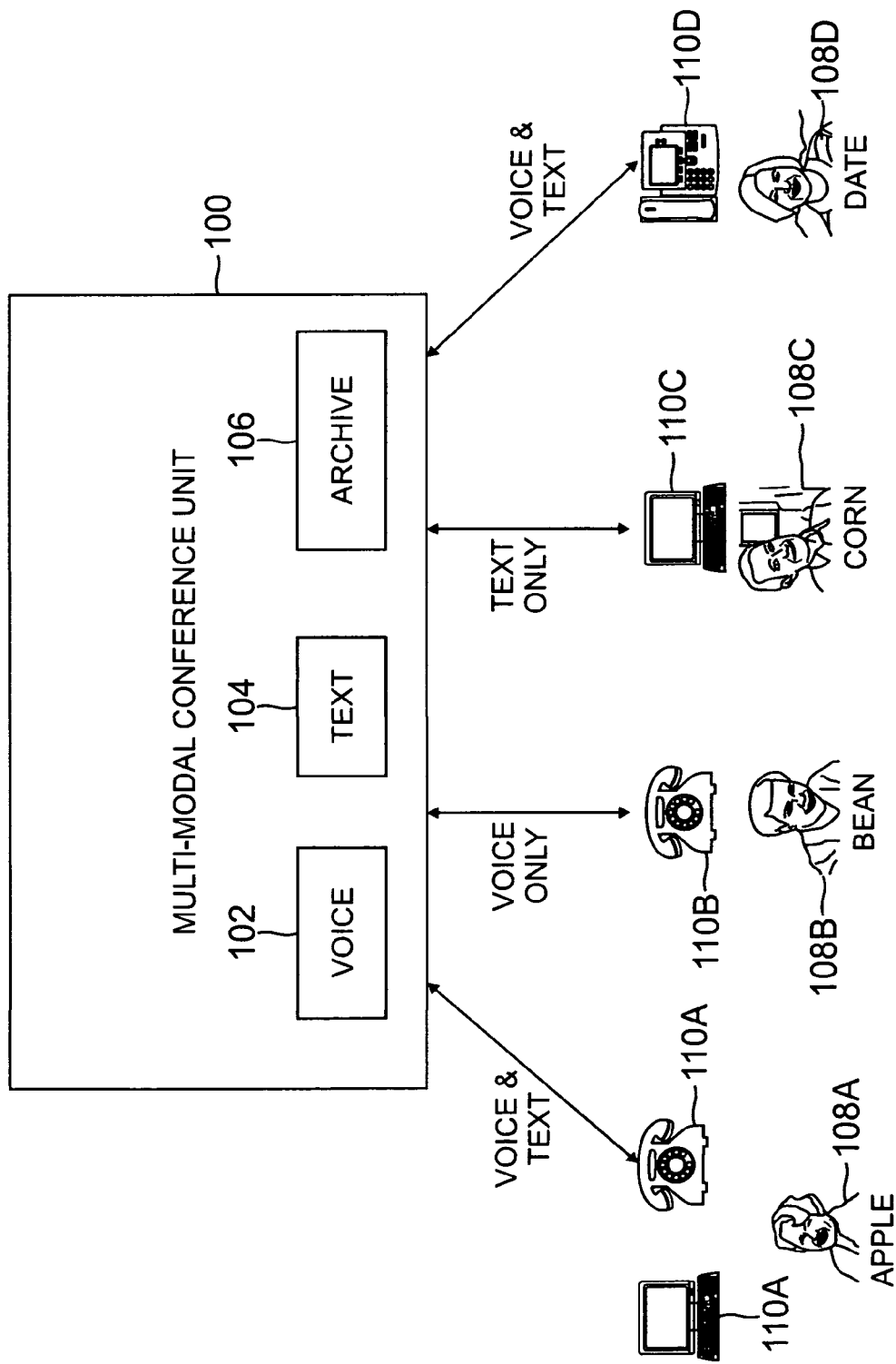
FIG. 1 is a block diagram showing an exemplary multi-modal conference unit (MMCU) which supplies voice and text conferencing capabilities in accordance with one or more aspects of the present disclosure.
Figure 2:
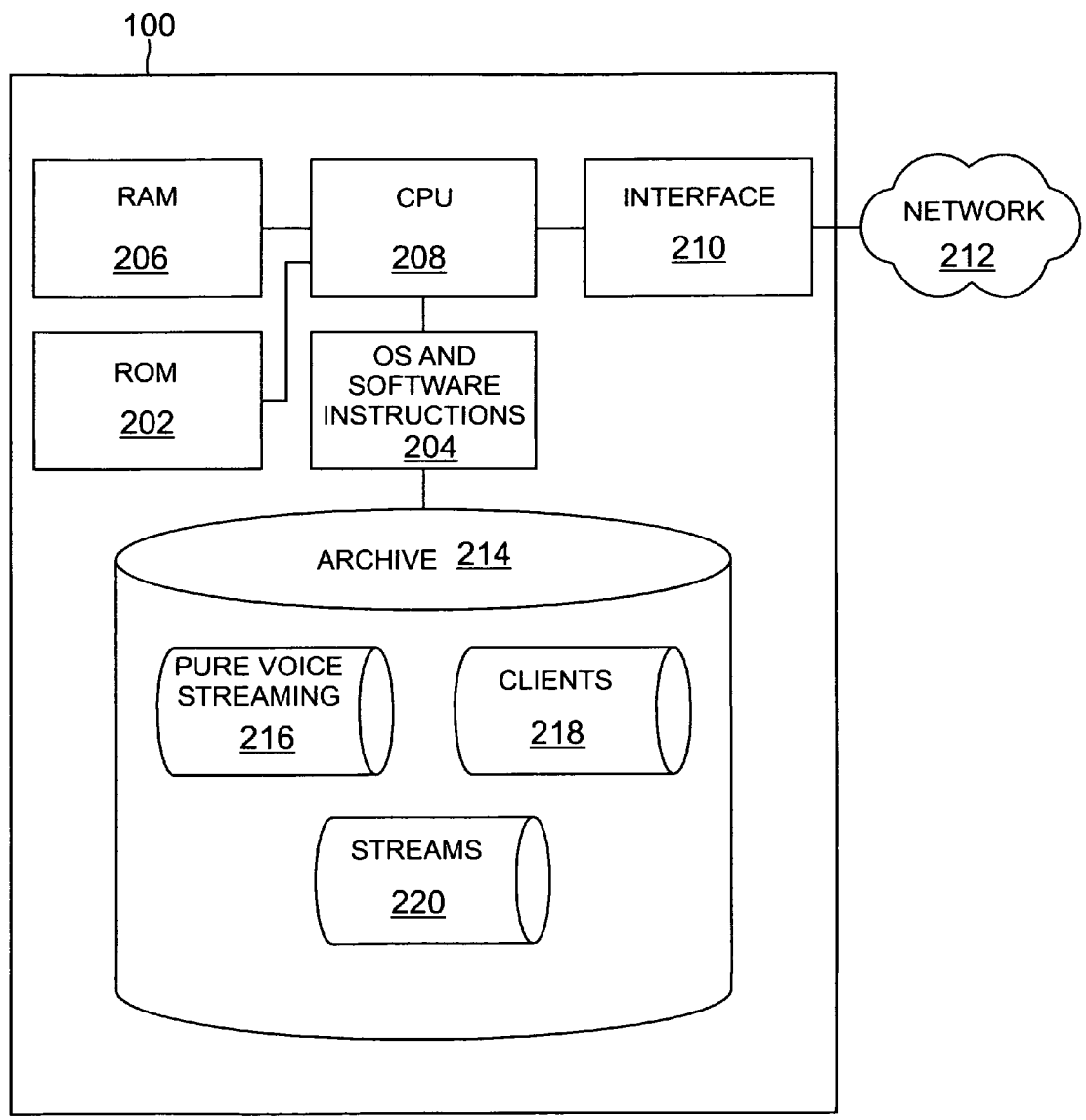
FIG. 2 is a block diagram depicting illustrative hardware and software of the MMCU in accordance with one or more aspects of the present disclosure.
Figure 3:
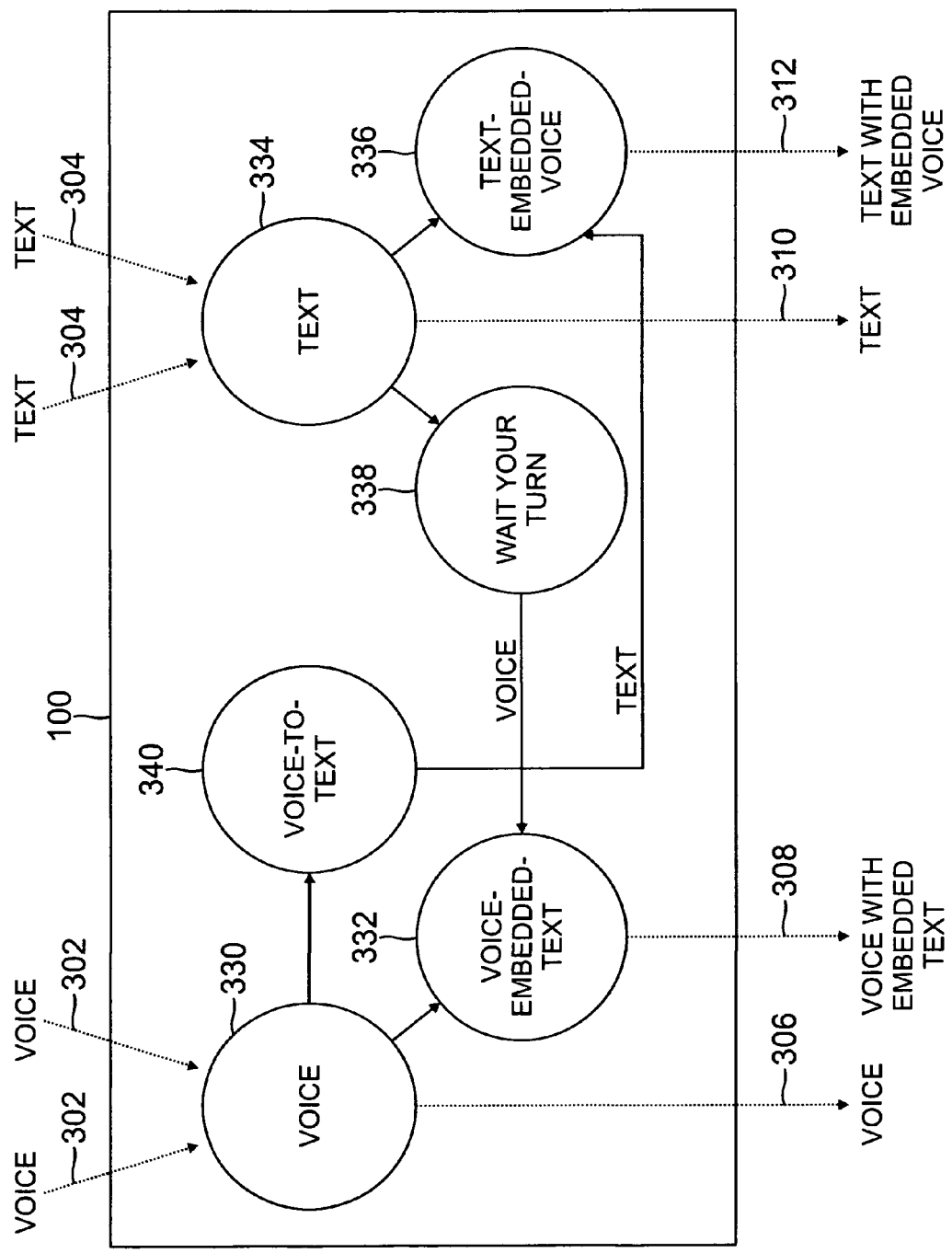
FIG. 3 is a block diagram depicting typical inputs and outputs of the MMCU in accordance with one or more aspects of the present disclosure.
Figure 4:
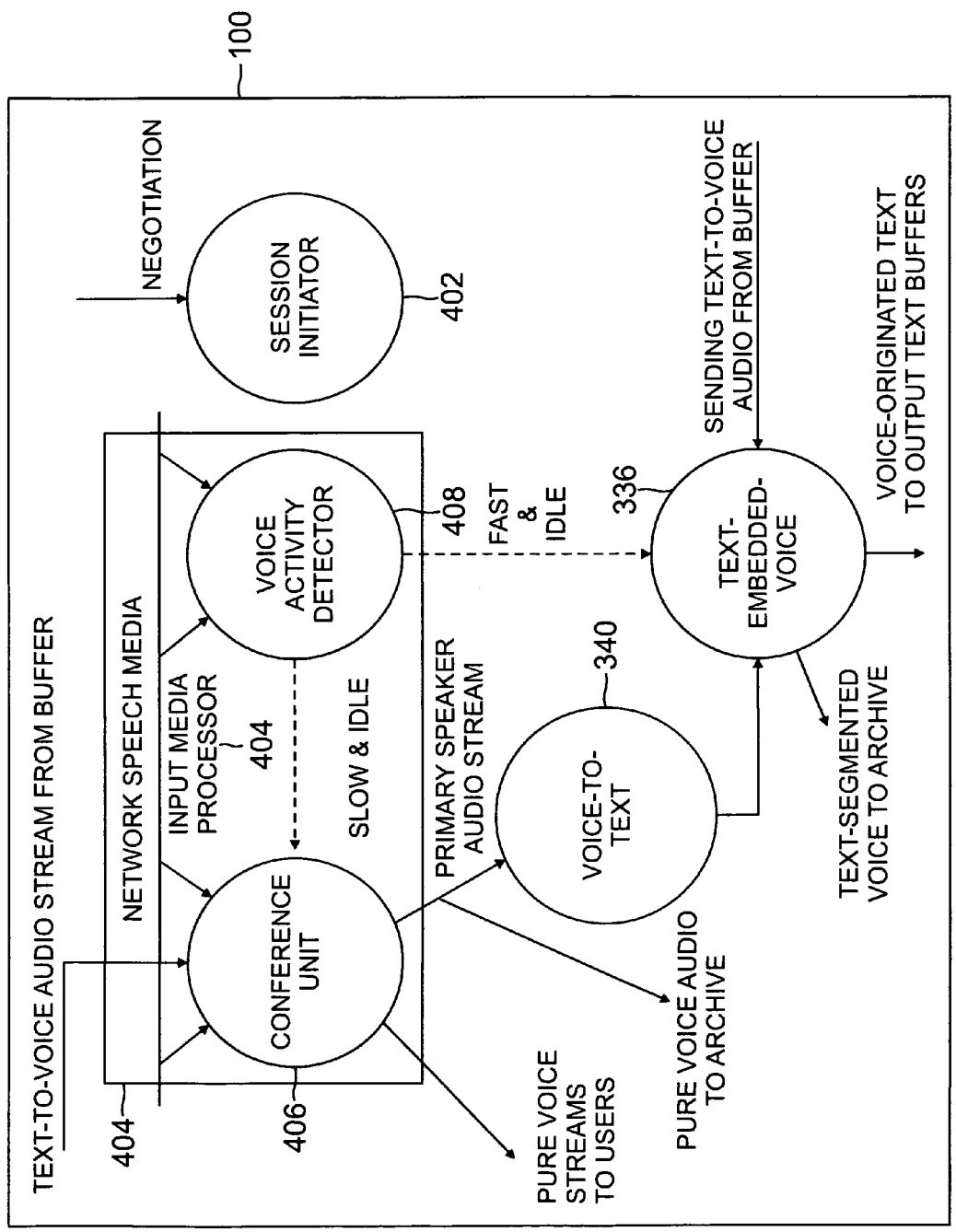
FIG. 4 is a block diagram showing typical resources of the MMCU in accordance with one or more aspects of the present disclosure.
Figure 11:
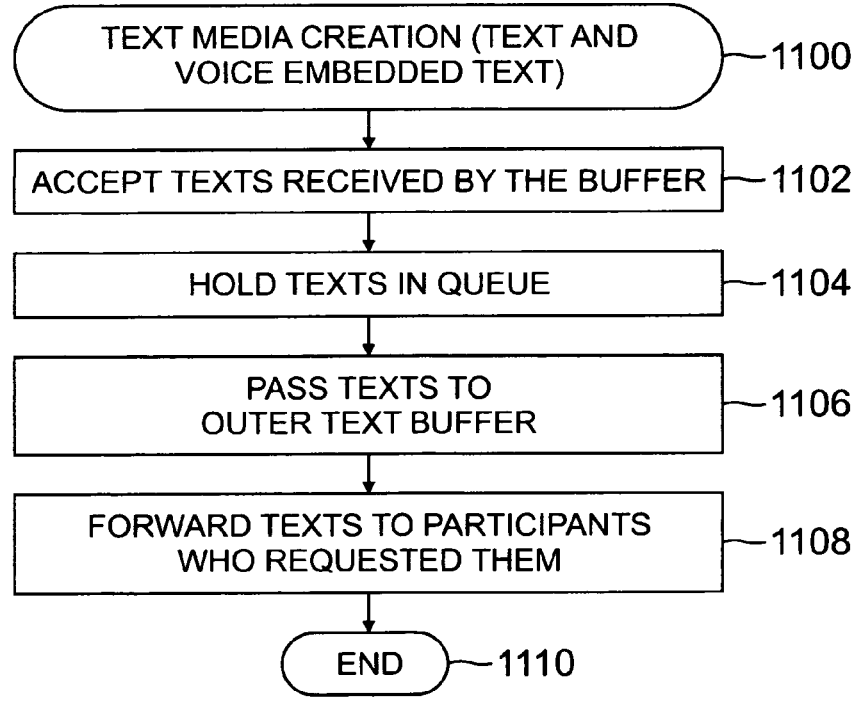
FIG. 11 is a flow chart showing illustrative procedures for text media creation (text and voice-embedded voice) through the MMCU in accordance with one or more aspects of the present disclosure.
Figure 12:
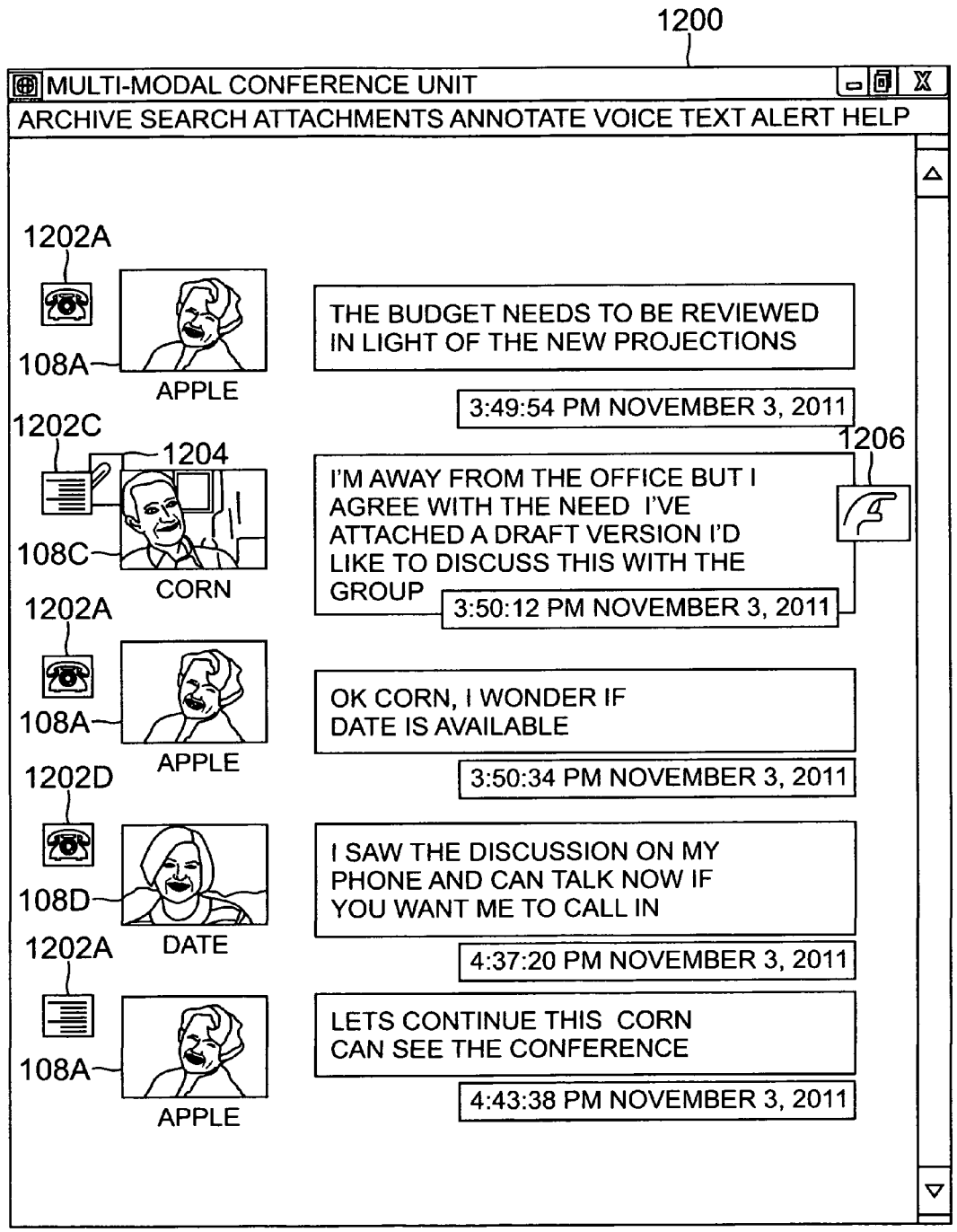
FIG. 12 is a screen shot providing an exemplary scenario described with the MMCU in accordance with one or more aspects of the present disclosure.

An exemplary environment for multi-modal communications is provided in FIG. 1. FIG. 2 shows exemplary software and hardware of the MMCU, while FIGS. 3 and 4 show features thereof. FIGS. 5 through 11 depict functions of the MMCU. FIG. 12 shows a non-limiting example of the MMCU. These FIGURES are not intended to be limiting, but rather provided to disclose features and concepts discussed herein. Within the present disclosure, the MMCU can also be referred to as an appliance or system. Furthermore, a device, as disclosed herein, can include both a receiver and transmitter and device can be referred to as either for purposes of this disclosure.

A number of advantages can be offered by the illustrative embodiment described above. The MMCU can allow multiple devices connected to the MMCU to communicate with one another regardless of preferred modality used by the individual devices. Mechanisms, unenforceable with previous systems, can be imposed herein including those related to different modalities. Furthermore, the MMCU can work with a number of different forms of communications including voice, text and video, to name a few. Many additional advantages of the present disclosure will become apparent to those skilled in the relevant art as provided for in the following description.

Multi-modal conferencing should not be confused with the well-known area of multimedia conferencing. Modality refers to the types of interactions that are made possible by a communication and/or collaboration system. There are three types of modalities that are generally recognized: synchronous, asynchronous and semi-synchronous. Media and multimedia systems such as that for voice, text, and video can be created to support each of these modalities. Each of these modalities can support different types of interactions that have advantages and disadvantages for various forms of communication and collaboration. The design of collaboration and/or a communication application, as described herein, will consider both the various forms of media required and the type of modality most suited to the interactions performed within it.

Modality refers to the types of interactions that are made possible by a communication and or collaboration system. There are three types of modalities that are generally recognized. Media and multimedia systems such as that for voice, text and video are created to support each of these modalities. Each of these modalities can support different types of interactions that have advantages and disadvantages for various forms of communication and collaboration. The design of collaboration and/or a communication application can consider both the various forms of media required and the type of modality most suited to the interactions performed within it.

The three generally accepted modalities for collaboration and communication applications can be described as:

(a) Synchronous—A primary example of this modality is the type of interactions supported by a voice telephone call. Interactions between the participants can take place in real time and responses are expected immediately after an utterance. Synchronous multimedia systems are of course possible;

(b) Asynchronous—The classic examples of applications that utilize this modality are ones that utilize electronic mail (email) and voice mail. Messages can be delivered and there is no expectation on the part of the sender of an immediate or even quick response. There is no assumption that the sender and receiver are simultaneously considering the same matter and both the sender and receiver can expect that the consideration of the message and any possible response to await a time when the receiver's attention turns to it; and (c) Semi-synchronous—The classic examples of applications operating with the semi-synchronous modality and ones that utilize a media is IM. The sender can provide an IM that is delivered to the receiver's IM client immediately. However the sender has no expectation that the receiver can attend to the IM immediately. The semi-synchronous modality entails an expectation that the sender and receiver can attend to other topics at any specific time but attend to an ongoing discussion in a timely manner.

The discussion above has indicated that communication and/or collaboration systems are designed to provide the form of modality that is best suited to the types of applications that are envisaged for the application. To accommodate these modalities, the use of a number of suitable mechanisms is expected of and by the participants. For the purposes of this disclosure these can be based on the mechanisms described below. A non-exhaustive list of such mechanisms are:

(a) Turn Taking—Participants cooperate to exchange ideas in a communication and/or collaboration application. Thus, a mechanism for the sharing of the group's attention (metaphorically sharing the floor) is expected. For synchronous modality applications, users do not normally talk over one another but instead use various clues or indications to show their desire for the group's attention or when having it their willingness to relinquish it;

(b) Conference Identification—Users can be participating in one or more conferences. Mechanisms can be provided to identify the conference in which a received interaction is situated;

(c) Participant Identification—Mechanisms are provided in each of the modalities to identify each of their participants and their specific interactions. This can be intrinsic to the interaction such as the sound of a specific voice or it can extrinsic such as a FROM field in a graphical user interface (GUI). Mechanisms are also provided to identify the collection of participants;

(d) Ordering of Interjections—Participants in a discussion interact in response to each other. This produces a natural ordering of interactions which allows others to sense the flow of the discussion. This can occur intrinsically in synchronous discussions by strict adherence to turn taking and the sole occupancy of the discussion floor by a single participant. In other modalities, however, explicit mechanisms of threading and ordering of responses to allow for this level of understandability;

(e) Modulation of Meaning—Human speech is fueled by metaphor, inflection, punctuation and other sources of ambiguity. Users can infuse a statement with meanings other than a straightforward interpretation of the constituent words would indicate. In one example, a subliminal meaning can be indicated by a change in tone of a speaker's voice. In other examples, the use of italics, capitals or other lexical indications can indicate a modulation of the bare meaning of the words;

(f) Expectation of Shared Awareness—The various modalities have differing expectations for the shared awareness of an issue among the participants. In a synchronous interaction, it is commonly assumed by participants that they share a common awareness of the state of the discussion within a conference. Participants can make elliptic comments that rely on the assumption that all other users will understand is meaning in context. Much less of this can be assumed for semi-synchronous conferences and even less than that for asynchronous. A user can turn to an asynchronous message after a prolonged hiatus from the conference and can have lost his/her place in the context of the discussion in the conference. Thus mechanisms such as threading, message subject lines, and even brief recaps in a message itself are used to ensure a requisite degree of shared awareness; and (g) Floor Domination—The expected and acceptable length of individual contributions in a conference can depend on the modality used. Commonly, it is expected that the length of an individual contribution in a conference with synchronous modality will be brief. The synchronous modality is preferred when highly interactive discussion is suited. Brief and to the point contributions are preferred. However, for asynchronous conferences, very lengthy and detailed contributions are in many cases considered desirable. Lengthy and considered written summaries can be placed in an asynchronous discussion thread and referred to at various times.

While a number of mechanisms have been described to handle the synchronous, asynchronous and semi-synchronous modalities, other mechanisms can exist and are within the scope of the present disclosure. For clarity of exposition, the multi-modal conference can be presented by way of an example. The exemplary application can be set so that it illustrates two objectives. Firstly, it can illustrate how participant contributions can be mediated between different media associated with each of the modalities so that the mechanisms necessary for both modalities can be observed. Secondly, it can illustrate how participants (human or machine) can be offered access to a conference by means of both modalities to allow their better participation with their human colleagues. Other additional features and functions will become apparent from the description provided below.

The exemplary application can illustrate how devices that are consistent with a semi-synchronous modality can be merged into a synchronous modality conference. That is, semi-synchronous IM devices can be merged with a synchronous voice conference with the mechanisms supporting the modality expectations of each side honored. The description can identify the required components to provide for the mechanisms described above. As well, a novel interface can be described which allows accessing the conference in both modalities.

Turning now to FIG. 1, an illustrative MMCU 100 of the current disclosure is provided. The MMCU 100 is illustrated which supplies the capabilities of voice conferencing 102 and text conferencing 104. The MMCU 100 can provide a conference facility that allows users to synchronously interact with use of both of these media simultaneously. Not shown, the MMCU 100 can also provide video capabilities and intermix the three forms of communications. The turn taking requirements above can be implemented within the MMCU 100. Additionally, archives 106 can be provided for stored interaction For purposes of illustration, FIG. 1 shows a conference among four people: Apple 108A, Bean 108B, Corn 108C and Date 108D (collectively participants 108). Fewer or more participants 108 can also be removed or added from the conference. Each of these participants 108 can have a different combination of media and can wish to interact with the conference in different ways through a number of devices 110A, 110B, 110C and 110D (collectively devices 110). Apple 108A, for example, can have a computer 110A and a telephone 110A. These devices can allow Apple 108A to both simultaneously send and receive both voice 102 and text 104 media. Apple 108A can wish to have an IM client on her computer create new messages and observe the conference IM stream. Apple 108A can also wish to access distinct IM and voice conferences.

Bean 108B, who is also connected into the conference through the MMCU 100, can have a voice telephone 110B. His contributions to the conference can be by voice only. However, he can also require that the IM conference be made available to him. Therefore, he can wish to have access to the text conference as well as the voice conference. Bean 108B would therefore wish to have IMs from the text conference to be converted to speech, identified and played in his received voice stream Corn 108C can have a computer 110C and can interact with the conference only by text. Therefore, similarly to Apple 108B, Corn 108C can wish to have the conference media mixed and presented to him in his preferred media. Therefore, he would wish to have a connection which he can receive the text messages from the conference and the voice contributions converted to text. He can also request identifying information of other participants 108 who provided the text.

Date 108D has a display phone 110D. The device 110D can be capable of sending and receiving voice and can also be capable of displaying IMs but not creating or sending them due to interface limitations. Date 108D can then prefer to interact with the conference in different ways. She can choose the separate conferences of Apple's 108A example or she can prefer to interact only with voice like Bean 108B. Date 108D could also prefer to be able to send and receive voice but to have both text and voice contributions displayed on her screen as in Corn's 108C example. With the running text and voice contributions displayed on her screen, Date 108D can scan the ongoing conversation to regain its context if she returns to it after a distraction.

Thus, the example MMCU 100 can accept a voice stream input and text stream input and provide four conference outputs: voice only, text only, text with voice mixed and voiced with text mixed. Users can connect to the MMCU 100 in any or all of these streams depending on their device 110 or intentions. The conference can supply the mixed mode turn taking capabilities described above. Archived outputs in each of the media can also be supplied. The details of these archived outputs will be described in detail later.

Video can also be provided to and received by the MMCU 100. By way of a non-limiting example, the video can be intermixed with voice. Previously defined images, or avatars, for just the voice can be used to recreate a setting within the conference defined by the MMCU 100. Those mechanisms for handling different modalities can be incorporated by the MMCU 100 to handle the video. For purposes of illustration, during a conference there are two streams of communication that can be in place. One is the direct interactions taking place within the conference and these take place by use of the floor-based mechanisms that have been described herein. The second is a meta-discussion or a continuous assessment of what is going on in the conference by all participants 108. All parties are observing the reactions of others and adjusting their interactions with the conference as a result of it.

Continuing, the current disclosure describes how the floor can be maintained for useful discussion and how attention can be focused on it. However, the observations of the second level of communication (meta-communication level) vary from individual to individual depending on their interests in the conference. One side in a negotiation is not really interested in seeing the face of the current speaker since they can be presenting their side's viewpoint which is well-known to them. They can be interested in the reactions of the other. Typically, video is not particularly useful in the first floor-level interaction but can be useful for the second. However, the mechanisms used in this second level bring up major issues in courtesy and privacy. A participant 108 can try to observe the reactions of others. They can try to eavesdrop on the whispered asides of others but that can be considered rude. Similarly they can observe the facial expressions of the other side and take hints from that. But staring constantly at them could be considered to be rude and even threatening. It carries a connotation of suspicion that one side does not wish to present.

So the way video is presented, especially if it is not under the common and/or individual control, bears directly on this meta-level of communication and brings with it major issues of privacy and the conveyance of unwanted connotations. Video is difficult to integrate into these conferences not because of any specific technical issue of carrying its media but because of its effect on the meta-discussion. Nevertheless, there are different ways of coupling video to the conference and the mechanisms that people use in this area are distinct from those described herein.

Mechanisms to address the lack of control issues for video that affect the second level conference can include providing a method by which individual users can determine which, if any, of the other participants is viewing their video feed. This can be done either in a common presentation to all participants 108 or in specific displays on the conference client available to individual users. In addition, providing one or more control mechanisms whereby individual participants can control access (grant or deny) of their video feed to other individual participants or classes of participants can be used. Some embodiments can include method whereby the conference creator, some other participant 108 or class of participants 108 can create a global policy to allow or disallow access to individual video feeds within the conference. These mechanisms can allow participants 108 control of what they are placing in the conference and can address second level issues of conference utility and acceptability. This 108 can address some of the concerns of participants 108 on the use of video. Video can be used on the first level, as well, as part of the mechanism of modulation of meaning (e.g. facial expression, arm movement of the speaker, etc.). The MMCU 100 can handle management of the video feeds.

Referring to FIG. 2, a block diagram depicting illustrative hardware and software of the MMCU 100 in accordance with one or more aspects of the present disclosure is shown. The MMCU 100 typically takes the form of a computer system. The MMCU 100 can include a ROM 202, operating system and software instructions 204, a RAM 206, at least one central processor (CPU) 208, an interface 210 connected to the network 212 and an archive 214. A conventional personal computer or computer workstation with sufficient memory and processing capability can be used as the MMCU 100. Alternatively, multiple interconnected servers can also serve as the MMCU 100.

The MMCU 100 can handle high volumes of transactions and large amounts of queries for communication and data processing. The RAM 206 and ROM 202 can be used to support the program codes that are operated by the CPU 208. The memory can be in a form of a hard disk, CD ROM, or equivalent storage medium. The CPU 208 can support authentications such as communications from external data servers, as well as allowing for anonymous transactions and general data encryption.

The archive 214 can include hard disk magnetic or optical storage units, as well as CD ROM, CD RW or DVD ROM and flash memory such as compact flash and secure digital cards. The archive 214 can contain archived materials that can be stored during a course of a conversation. The archive 214 can be annotated, extracted and searched. Media can be kept in its own separate partition or can be set in its own separate database. The archive 214 can be indexed, by way of non-limiting examples, through pure voice streaming 216, clients 218 and streams 220. Data can flow from each and be interconnected through logical or physical connections. The media within the archive 214 can also be indexed through a number of techniques such as by creator of the media and period it was produced.

The MMCU 100 can include an interface 210 in order to communicate with other components over the network 212. Many types of networks 212 can be integrated and used with the MMCU 100. The network 212 can include, but is not limited to, a local area network (LAN), wide area network (WAN), personal area network (PAN), campus area network (CAN), metropolitan area network (MAN), global area network (GAN) or combination thereof. Such networking environments are commonplace in office networks, enterprise-wide computer networks, intranets and the Internet, which are all types of networks 212.

A number of ports or communication channels can be provided through the interface 210 to connect with participants 108. Network addresses can be used to receive and send information to and from the participants 108, which will be described below. Conventional internal or external modems can serve as a network interface 210. A cable modem can be used as a network interface 210. The network interface 210 can support modems at a range of baud rate from 2400 and upwards.

While the above embodiment describes a single computer system acting as the MMCU 100, the functionality can be distributed over multiple computing systems. The databases can also be distributed over a cloud computing environment. In one embodiment, the MMCU 100 can be configured in a distributed architecture, wherein the databases and processors are housed in separate units or locations. Some servers perform the primary processing functions and contain at a minimum RAM, ROM, and a general processor. Each of these servers can be attached to a WAN hub which serves as the primary communication link with the other servers and interface devices. The WAN hub can have minimal processing capability itself, serving primarily as a communications router. Almost an unlimited number of controllers can be supported. This arrangement yields a more dynamic and flexible system, less prone to catastrophic hardware failures affecting the entire system.

A block diagram of an MMCU 100 which meets the requirements described in the example operation above is illustrated in FIG. 3. This diagram is intended only to be an illustration to aid in the understanding of system operation. A more specific diagram containing identified system elements will be supplied further below. While only voice conferencing 102 and text conferencing 104 are described, the addition of video can be easily implemented within the MMCU 100.

For the example MMCU 100, voice inputs 302 and text inputs 304 can be supplied and four outputs can be provided. These will be voice 306, voice with embedded text 308, text 310 and text with embedded voice 312. Six major components can be provided within the MMCU 100. These components can be modules and be implemented within software, hardware or combination of both. These components can include a voice conference unit 330, a voice conference unit that will accept the generated voice from the text conference (VET or voice-embedded-text) 332, a text conference 334 and a text conference that will contain embedded text conversions of voice contributions (TEV or text-embedded-voice) 336. Two additional components can supply the necessary conversion between media. These can be the wait your turn component (WYT) 338 which can create voice from incoming text so as to meet the turn taking requirements of the applications and voice-to-text component 340 which can create identified text messages from voice contributions. Other components can be used and furthermore, the six components described above can be broken or combined into other components.

To understand the MMCU 100, as shown in FIG. 3, incoming voice 302 and incoming text 304 contributions can be received from the participants 108 through their devices 110 that can be configured to send text 304 only, text 304 and voice 302 or just voice 302. The MMCU 100 can supply the outputs of voice 306, voice with embedded text 308, text 310 and text with embedded voice 312. Videos or other media can be implemented within the MMCU 100, but for purposes of illustration, voice 302 and text 304 will be used below.

In operation, voice contributions 302 can be supplied to a voice conference circuit 330 from participants 108 who have such capabilities through their devices 110. The conference output can be sent to users through voice only 306 directly from the voice conference circuit 330. It can also be sent to a speech recognizer (voice-to-text element) 340 in which it can be partitioned and transcoded into IMs, that is, text. These texts can be interleaved with IMs sent from participants 108 at TEV 336. The combined output of incoming user texts 304 and the embedded voice texts can be sent to participants 108 as text with embedded voice stream 312.

Incoming texts 304 can go through the text conference 334 as text only 310. Texts 304 received over the network 212 from IMs, or the like, at the text conference 334 can be queued at the WYT 338. To adjust for different modalities implemented between incoming voice 302 and text 304 communications, a pause or idle period can be implemented at the WYT 338. By way of a non-limiting example, suppose if the WYT 338 were not implemented and instead incoming texts 304 were converted to audio and interjected at any time. This could potentially cause an untimely consequence by adding in voice into a voice conversation and break it up. The incoming text 304 at the WYT 338 can be held until a gap in the conference indicating no primary voice speaker is detected. The text in the WYT 338 can then be converted to voice in WYT 338 and appended with a participant's identification. Alternatively, the text can be stored as voice and provided when an idle period in the voice communications is present. That is when an appropriate occasion is observed, a new interaction can assume the floor. These text contributions converted to voice can be mixed with the participant 108 voice contributions in a voice-embedded-text element 332 and supplied to participants 108 who request it as voice with embedded text 308.

With the synchronization supplied by these elements, a natural form of turn taking can be created in which incoming voice 302 and incoming text 304 are mixed to maintain a natural flow of the conversation in a conference. Voice modalities are typically synchronous while text is usually semi-synchronous. Through the implementation described above, both modalities can be implemented into one system seamlessly.

Different modalities for the devices 110 can be merged also by conference identification, participant identification, ordering of interjections, modulation of meaning, expectation of shared awareness, floor domination or combination thereof. By way of a non-limiting example of modulation of meaning, the MMCU 100 can detect metaphors, inflections, punctuations and other sources of ambiguity by analyzing incoming text 304 to the MMCU 100. If bold letters are used in the text, the MMCU 100 can take into account that the text-to-audio conversion should have a synchronous modality and voice communications can be interrupted, instead of using the WYT 338. Other stressed syllables from the incoming voice 302 can be used to note the modulation of meaning. For example, if a soft incoming voice 302 is received, the voice can be muted and not be part of a synchronous modality. Other indicators can include hastily written text or document uploads. Additional mechanisms for handling different modalities will become apparent from the description provided below.

FIG. 4 is a block diagram showing typical resources of the MMCU 100 in accordance with one or more aspects of the present disclosure. As shown below, a number of features that can use those resources provided by the MMCU 100 can be conference creation (FIG. 5), participant joining (FIG. 6), participant removal (FIG. 7), sample selection (FIG. 8), text buffering (FIG. 9), streaming media creation (voice and text-embedded-voice) (FIG. 10) and text media creation (text and voice embedded text) (FIG. 11).

Figure 5:
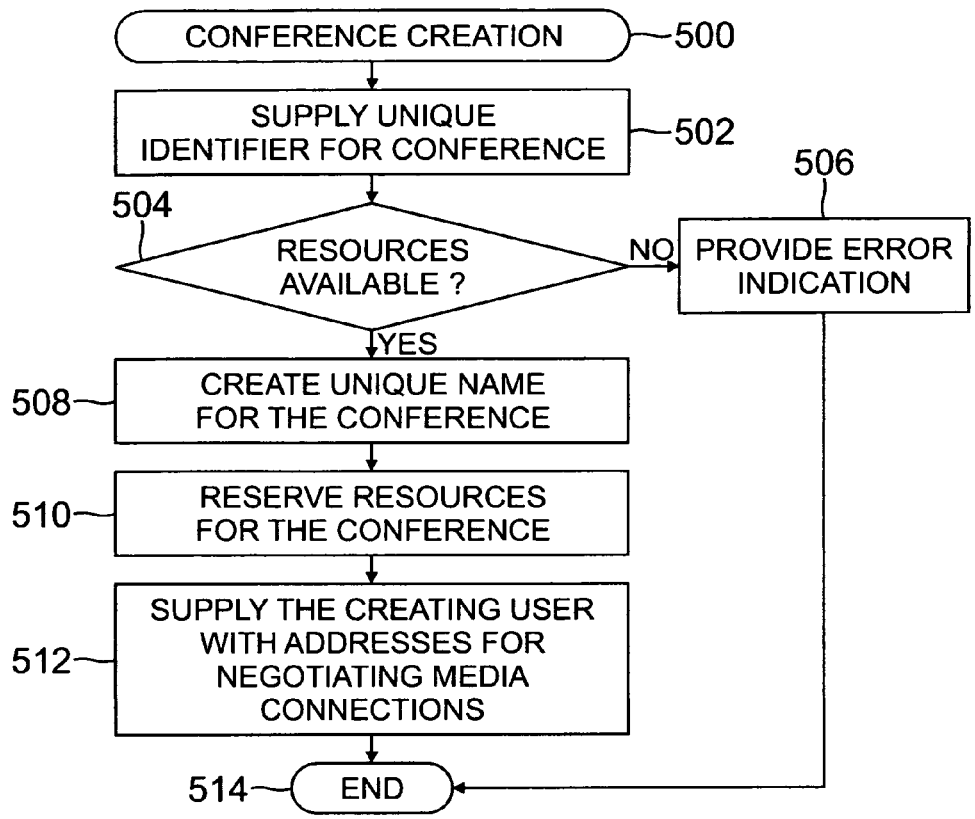
FIG. 5 is a flow chart showing illustrative procedures for conference creation through the MMCU in accordance with one or more aspects of the present disclosure.

One such resource provided by the MMCU 100 can be a session initiator (SI) 402. FIG. 5 is a flow chart showing illustrative procedures for conference creation through the MMCU 100 in accordance with one or more aspects of the present disclosure. To begin any conference, the MMCU 100 can be used to initialize the conference through the SI 402. The processes can begin at block 500. The SI 402 can be the coordinating entity to process participants 108 and their devices 110. A conference unique identifier can be supplied at block 502. This can be done by a user or a system management entity. The identifier can be temporarily established by the MMCU 100 or be permanently set in place, for example, with use for weekly meetings at a company. Through the issuance of a unique identifier, modalities can be settled between each of the devices 110 participating in the conference.

A participant 108 can use a negotiation protocol to negotiate the creation of a conference with the SI 402. These negotiations can be established through ports or other communication channels defined within the interface 210 of the MMCU 100. At decision block 504, a determination can be made whether there are enough resources to add a participant 108 and/or create a conference. This can include whether there are enough network addresses to attach new participants 108. If not, an error indication can be provided at block 506 and the processes can end at block 514 without the creation of a conference. Assuming that the resources are available to create the conference, the negotiation can create the unique conference name at block 508. This name can be selected by either the SI 402 or the creating user. As part of the negotiating process, the SI 402 can supply the creating user with the addresses by way of which participants 108 can negotiate media connections for the conference with the MMCU 100.

At block 510, the SI 402 through the negotiations can reserve resources for the conference through the MMCU 100. Typically, the MMCU 100 would only be allowed to handle enough conferences as it can maintain, for example, the number of channels, ports or network addresses that the MMCU 100 can handle through its interface 210 with the network 212. At block 512, the SI 402 can supply the creating user with addresses for negotiating media connections as a result of there being enough resources for the connecting participants 108 and their devices 110.

While the number of devices 110 and the resources allocated by the SI 402 are to be determined when the conference is created, the SI 402 can also allow for situations in which more users can be continuously added and when the maximum amount of resources have been reached, new participants 108 would be denied entrance into the conference through the MMCU 100. Alternatively, the MMCU 100 can be durable and fetch additional resources to add in the new participants 108. The processes can end at block 514.

In a preferred embodiment, there can be multiple sets of the system resources identified in FIG. 4, each able to supply one conference. The SI 402 can reserve one of these resource sets for use by the conference under creation. In another embodiment, only one set of components can be supplied and the SI 402 can function exclusively with them. Logical or physical connections can be made by the SI 402 within the MMCU 100 to reserve resources.

Figure 6:
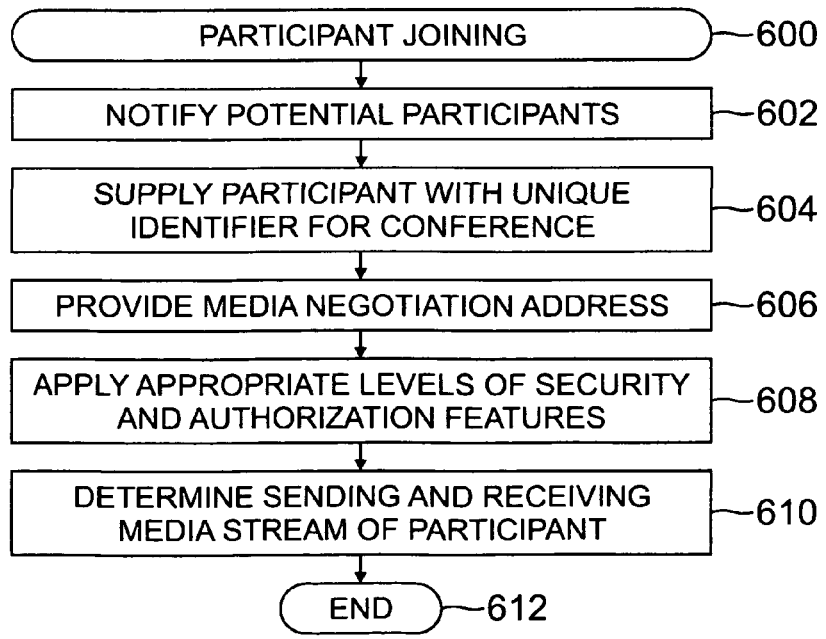
FIG. 6 is a flow chart showing illustrative procedures for joining participants into the conference through the MMCU in accordance with one or more aspects of the present disclosure.

With the conference created and its unique identifier and media negotiation address specified, potential participants 108 can be notified of the conference. FIG. 6 is a flow chart showing illustrative procedures for joining participants 108 into the conference through the MMCU 100 in accordance with one or more aspects of the present disclosure. This can be done by a central advertisement or by direct messaging, for example. With this, each participant 108 can obtain or be supplied with the unique conference identifier and the media negotiation address. The processes for joining participants 108 can begin at block 600. Typically, the SI 402 can handle these processes.

At block 602, the SI 402 of the MMCU 100 can notify potential participants 108 by requesting their participation into the conference established earlier. This can occur through one or more forms of communications such as an email, calendar entry and voice automated telephone call, to name a few. At block 604, the MMCU 100 can supply the potential participant 108 with a unique identifier for the conference. A participant 108 wishing to enter the conference can negotiate access with the SI 402 using the media negotiation address provided at block 606. An appropriate level of security and authentication services can be supplied for this purpose at block 608. This can include verifying the devices 110 that the participants 108 are using or having the participants 108 access a password and username.

The participants 108 can engage the SI 402 in a negotiation process similar to the SIP protocol. At block 610, the participants 108 can indicate which media streams they can send and which they wish to receive. In the illustration of FIG. 1, for example, Apple 108A can send both text and voice, but choose to only receive text. In the example MMCU 100 used in this disclosure, the participants 108 can provide either or both voice or IM media to the conference. They can accept one or more of the following media:

(a) A pure voice media stream 306;
(b) A voice media stream in which received text messages will be embedded voice 308;
(c) Pure IM media 310; and
(d) IM media in which the voice inputs have been converted to text and embedded 312.

When converting text to voice, a number of controls can be provided by the MMCU 100 or the device 110 to maintain a correct translation of the audio. When the audio is converted, the received corresponding audio can be placed by the text. If there is any confusion on what the text corresponding to the audio is, an icon or question mark can be placed by the text. Other forms of error checking can be provided such as underlining questionable text. In one embodiment, spelling and grammar checking can be implemented by the MMCU 100. The processes can end at block 612.

During negotiation, the SI 402 can obtain from each participant 108:

(a) A unique name by way of which the participant 108 can be identified;

(b) Which type of media that the participant 108 wishes to send to the conference;

(c) The type of media that the participant 108 wishes to receive from the conference;

(d) For participant 108 reception of streaming media such as voice 306 and voice with embedded text 308, the IP address and channel or other network address to which the media should be sent and the standard in which it should be encoded;

(e) For participant 108 reception of text media 310 such as IM or text with embedded voice 312, the protocol which can be used to send it and application address of the text client that can receive these messages;

(f) For MMCU 100 reception of streaming media, such as incoming voice 302, the encoding standard in which it can be sent; and (g) For MMCU 100 reception of incoming text media 304, the protocol that can be used to send it.

During negotiation, the SI 402 can supply each participant 108:

(a) For reception at the MMCU 100 of streaming media such as voice 302, the IP or other network address on which the media should be sent. The reception address sent to each participant 108 can be unique to distinguish media from each participant 108;

(b) For reception at the MMCU 100 of text media 304 such as IM, an address at the MMCU 100 where this media should be sent.

The lists are non-exhaustive and some embodiments can obtain and provide other additional information relevant to the connection of participants 108 into the conference. The information obtained by the SI 402 during negotiation can be used by other components in a specific conference as described below. In a preferred embodiment, this information can be placed in a memory shared by each of these components and the SI 402. With this, each component in a specific conference can have access to the same memory for control by the SI 402. In another embodiment, the SI 402 can send the information appropriate to each component to them by direct messaging. The use of this information by components will be described below.

Figure 7:
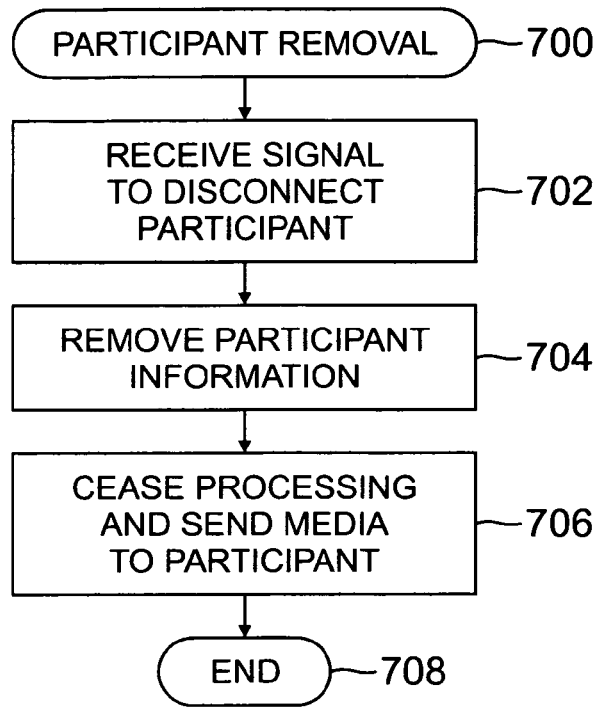
FIG. 7 is a flow chart showing illustrative procedures for removing participants from the conference through the MMCU in accordance with one or more aspects of the present disclosure.

The SI 402 can also be used to remove participants 108 within the conference. FIG. 7 is a flow chart showing illustrative procedures for removing participants 108 from the conference through the MMCU 100 in accordance with one or more aspects of the present disclosure. The processes can begin at block 700. In the same way that the participants 108 negotiated their connection to a conference, the participants 108 can also signal the SI 402 that they wish to leave it at block 702. In the preferred embodiment of using shared memory control, the SI 402 can remove the information for that participant 108 from the conference at block 704. The removal from memory, at block 706, can cause the other conference components to cease processing and send media to the participant 108. In other embodiments, the SI 402 can signal each component by direct message or other ways to remove processing and sending of media to a participant 108. The processes can end at block 708.

In some embodiments, the removal of all participants 108 from a conference can cause the conference to be terminated. The termination of the conference can then free up resources for other devices 110 who wish to participate in a conference. In other embodiments, the removal of one or more identified participants 108 from a conference can cause it to be terminated. This can be the creating participant 108 or some other participant 108 identified by him/her in the conference set up negotiation process through the SI 402. In some embodiments, the creating participant 108 or other creating entity can signal the conference directly to terminate the conference. In preferred embodiments, this can cause all conference information to be removed from the shared memory and as a result all processing of media from and sending of media to all participants 108 can cease.

Continuing with FIG. 4, the creation of streaming media (voice 310 and TEV 312) will now be described. Incoming voice stream 302 from participants 108 can be terminated on the input media processor (IMP) 404. The IMP 404 can have multiple independent network addresses and/or ports. During negotiation for conference admission, the SI 402 can have supplied each user requesting it a separate network address and/or port. The use of these separate network connections can allow the separate voice streams from each participant 108 to be identified and discriminated from that of other participants 108.

The IMP 404 can include two major components: a conference unit (CU) 406 and a voice activity detector (VAD) 408. The CU 406 can create a voice conference stream from the inputs and supply it to other portions of the MMCU 100. The VAD 408 can monitor the voice stream 302 to determine the identity of the current primary speaker and if the conference is in an idle state with no primary speaker for synchronization between incoming texts and voice contributions.

In a preferred embodiment, the CU 406 can include a sample switching conference unit. In other embodiments, a summing conference technology can be used. In a sample switching conference unit, voice streams 302 from participants 108 can be encoded as a stream of absolute digital samples (G711 other similar encoding scheme). During each sample period, samples from the users can be compared and the largest sample selected. This largest sample can then be sent to the users. In essence, the provision of largest samples can select the media from the participant 108 who is the current speaker and is thus the focus of the voice conference. The largest sample can be pulled away from background noise and erroneous established connections. This can be one example of floor domination to resolve modalities used by different devices 110.

For the particular CU 406 of the MMCU 100, three voice outputs can be used. For psychological acoustic reasons and for network stability, a speaker's input should not be switched back to them. The echo caused can confuse the speaker and destabilize the transmission performance of the MMCU 100. Each participant 108 can use a specific output, that is, the output which contains the loudest sample which is not their own. Therefore the CU 406 can create separate output streams for each participant 108 who wishes to receive the voice conference.

Figure 8:
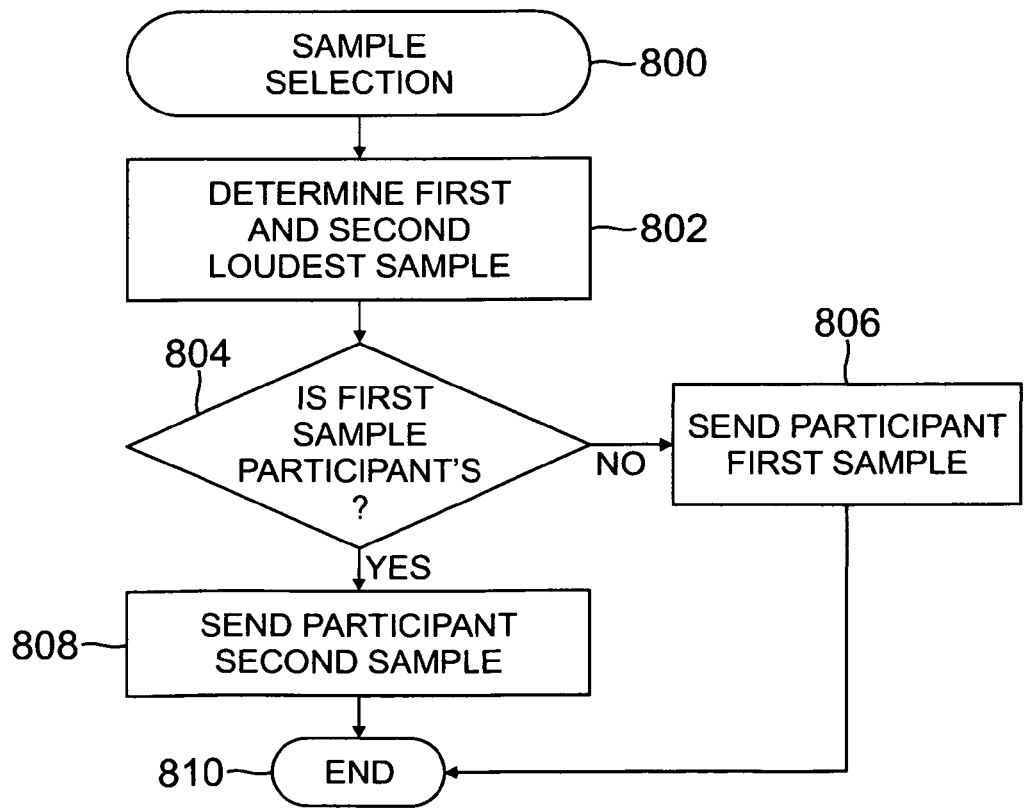
FIG. 8 is a flow chart showing illustrative procedures for providing voice samples to a participant through the MMCU in accordance with one or more aspects of the present disclosure.

FIG. 8 is a flow chart showing illustrative procedures for providing voice samples to a participant 108 through the MMCU 100 in accordance with one or more aspects of the present disclosure. The processes for providing sample selection can begin at block 800. At block 802, the CU 406 can select the loudest and second loudest sample. In practice, this can mean during a sample period. At decision block 804, the CU 406 can determine whether the first sample is the participant's 108. If the first loudest sample is not the participant's 108, at block 806, the first sample can be sent to the participant 108. Otherwise, the CU 406 can send the second loudest sample to the participant 108 whose sample was the loudest and the loudest to everyone else. Thus a primary speaker can hear the rest of the conferees in order to allow for them to pick up social cues from people wanting to interject while the other conferees can hear the primary speaker. The processes can end at block 810.

The CU 406, as shown in FIG. 4, can create voice streams for purposes of archiving and to create a text stream from it for users who have requested this media. The CU 406 can also create an output that can consist of the primary speaker only thus the loudest sample in each sampling period. In a preferred embodiment, IP technology can be used and incoming voice 302 can be sent using the RTP protocol. The CU 406 can de-packetize and transcode the incoming voice 302 representations into a G711 or other absolute value encoding scheme. This can use code and jitter buffer technologies. Outgoing streams can be transcoded into the desired protocol for each user as specified in the conference joining negotiation.

Figure 9:
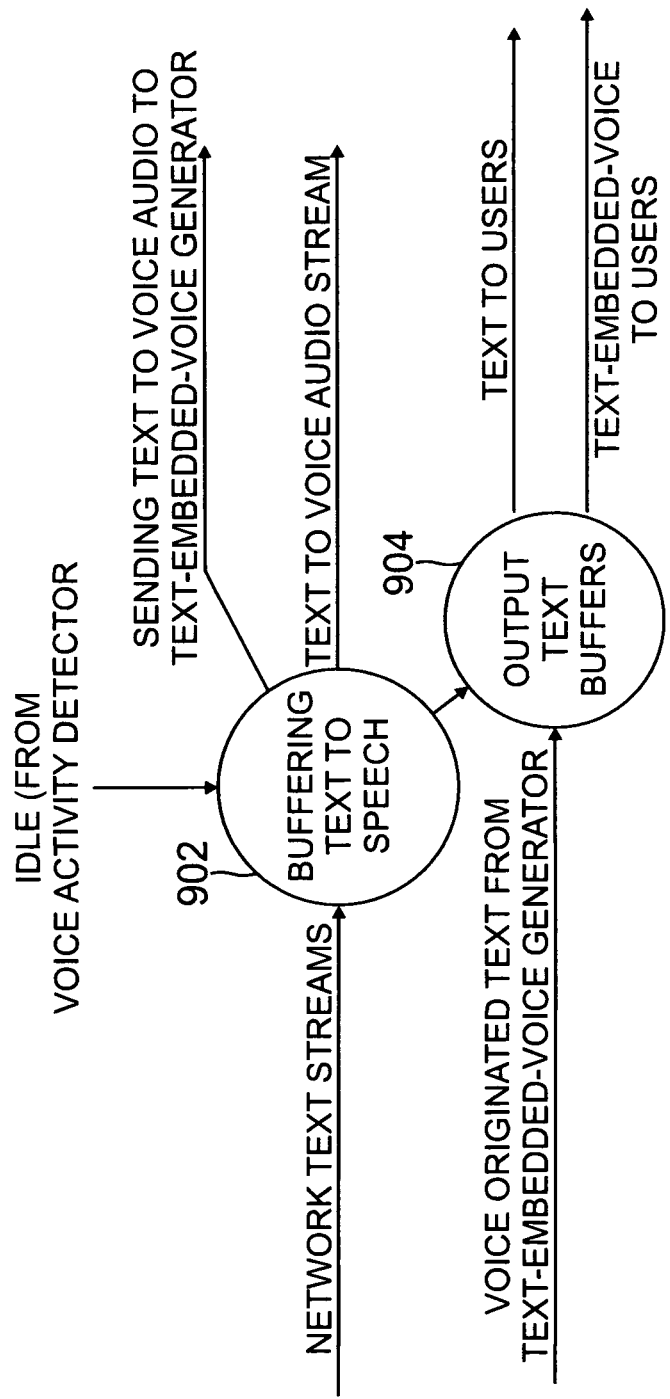
FIG. 9 is a block diagram depicting exemplary buffers providing text and voice to participants through the MMCU in accordance with one or more aspects of the present disclosure.

Referring to FIG. 9, a block diagram depicting exemplary buffers 902 and 904 providing text and voice to participants 108 through the MMCU 100 in accordance with one or more aspects of the present disclosure is shown. Another voiced output is one in which incoming texts are embodied with certain outgoing voice streams. These streams can allow users to audit both text and voice interjections in the voice format. The primary issue for this service is, as described previously, to synchronize the voice and text inputs 304. Text inputs 304 typically should not barge in over a current speaker but wait their turn until there is an indication that the current speaker has relinquished the floor and new speakers can take over. This task is accomplished by the BUS (buffering text to speech converter) 902.

Figure 10:
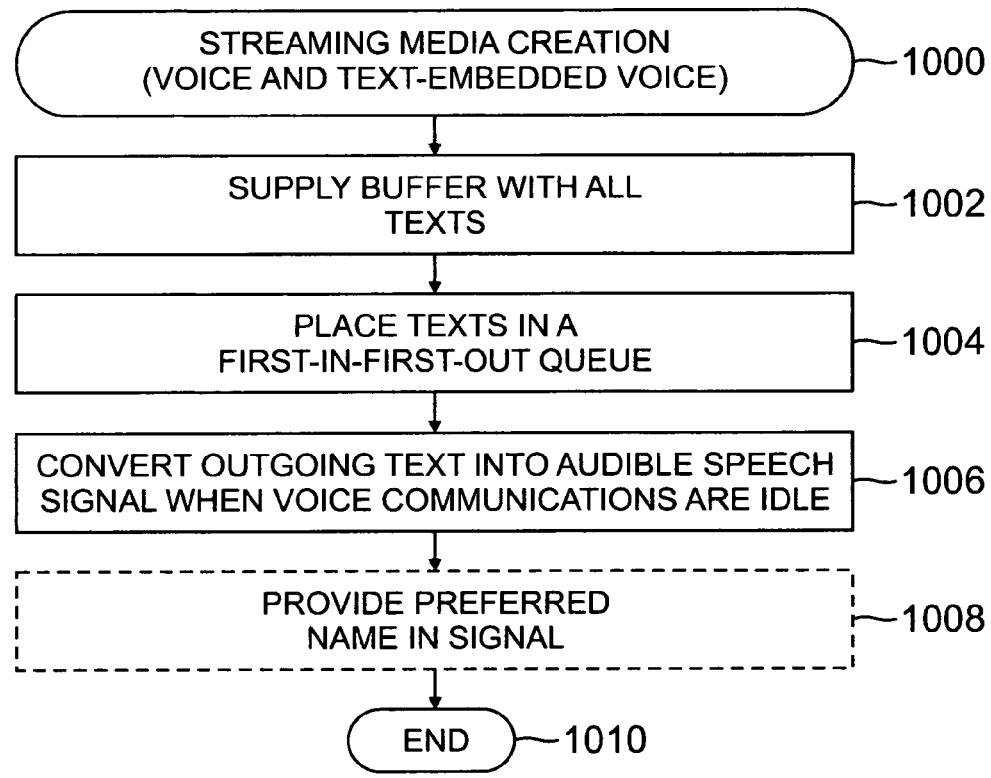
FIG. 10 is a flow chart showing illustrative procedures for streaming media creation (voice and text-embedded voice) through the MMCU in accordance with one or more aspects of the present disclosure.

FIG. 10 is a flow chart showing illustrative procedures for streaming media creation (voice and text-embedded voice) through the MMCU 100 in accordance with one or more aspects of the present disclosure. The processes can begin at block 1000. As shown, the BUS 902 can be supplied with incoming texts 304 that are sent to the text address supplied to participants 108 for the conference at block 1002. At block 1004, the texts 304 can be buffered in a first-in-first-out (FIFO) queue. The BUS 902 can have the capacity to convert the text 304 into an audible speech signal when voice communications are idle at block 1006. It can also examine the sender information in the received text 304 to determine which participant 108 has sent it. The BUS 902 can then take the preferred name supplied by that participant 108 to the conference and pre-append this in a canned phrase to the voice message optionally at block 1008. So if a participant 108 "Apple" sent the message "Lets meet next Monday at 1:00 PM" to the conference, The BUS 902 would produce the voice utterance "Text from Apple: Let's meet next Monday at 1:00 PM". This can allow other participants 108 to be aware of the text and who sent it. The processes can end at block 1010.

As shown above, the BUS 902 can supply voice texts to the conference if there is a current gap in the conversation indicating that it is socially acceptable to do so. In one embodiment, this can occur when providing the text would not interrupt the natural flow of the conversation. This indication can come from the VAD 408 which was shown in FIG. 4. The VAD 408 can be responsible for two related functions. Firstly, it can determine which, if any of the voice participants 108 is the current primary speaker. Secondly, it can determine if there is a short period of inactivity in the voice conference which indicates that there is a social acceptability for a text message to be inserted.

The VAD 408 can function as an energy detector and can determine that speech is present if there is energy in a voice channel for a sufficient proportion of a suitable time period (in a preferred embodiment, about 120 milliseconds). Appropriate hardware and software can be used to implement the VAD 408. The VAD 408 can facilitate speech processing, and can also be used to deactivate some processes during a non-speech section of an audio session: it can avoid unnecessary coding/transmission of silence packets in Voice over Internet Protocol (VoIP) applications, saving on computation and on network bandwidth. For an MMCU conference application, the social expectations (keyed to the usefulness of the conference) can be such that there can only be one speaker at a time and the others can listen in silence. In one embodiment, the VAD 408 can provide energy detectors for all incoming voice streams. A candidate primary speaker can be declared if the power in their channel rises about a certain activity threshold and is greater that the power in all other channels. Two or more consecutive periods in which no channel has power greater than the certain silence threshold (less than the activity threshold) can be determinative of an idle state which is indicative that a text message can be sent to the voice conference. The VAD 408 can also be used to determine and take into account of the loudness of some participants' 108 voices. For example, some participants 108 can have a louder voice naturally than others and not necessarily intend to take the conference floor or be the primary speaker. The VAD 408 can account for this.

In one embodiment, the participant's identity of the primary speaker will not be changed until a new primary speaker has been identified. Thus during an idle period, the identity of the VAD 408 determined primary speaker will not be changed. The VAD 408 can also maintain the primary speaker's identity and the current idle state of the voice conference in the shared memory.

Returning to FIG. 9, the BTTS 902 can monitor the idle signal supplied from the VAD 408. If present, the BTTS 902 can begin to playback the converted text messages from its buffer. In a preferred embodiment, this converted text message can be sent in digital format to the CU 406. At the CU 406, this voice can act as normal. Therefore it can send the signal and be treated as any other and in practice can be the only active speaker.

The CU 406 can produce the following voice steams:

(a) A primary voice stream that can contain the signal of the current voice participant 108. This generally does not contain the speech derived from texts;

(b) A pure voice stream for users. This can contain only the voice signals from voice participants 108. That is, it can contain no speech derived from text. As indicated above, the participants 108 who wish to receive this stream can receive that of the loudest participant 108 unless they are the loudest participant 108 in which can they will receive the second loudest. This stream can be useful for those participants 108 who wish to monitor the text and voice conferences separately.

(c) A conferenced voice stream in which speech derived from text can be inserted. This can be suitable for the participants 108 described above who wish to listen to the conference in voice only. The algorithm can be described as above. Participants 108 can receive the loudest speaker (including the BTTS 902) unless they are the loudest participant 108 in which case they will receive the second loudest.

The embodiment described, of having the BTTS voice signals mixed thought the CU 406 with the other voice signals, can have the advantage of mixing the background noise from other participants with the BTTS signal. This can produce a more natural sound and make the BUS signal appear to more of the conference than a mechanically injected voice. Other embodiments could interweave the streams from the CU 406 and the BUS 902 into an outgoing RTP stream without mixing in the CU 406. The synchronized action of the BUS 902 can therefore interject text messages as speech into a suitable voice stream for supply to the users who have requested it.

In some embodiments, the BUS 902 can send only one text message as voice at a time and then wait until a new condition of idle is detected. That is, it can wait until the current idle state is removed and is replaced by a future one. This can prevent text messages from dominating the conference and allow natural voice contributions. In other embodiments, the BUS 902 can provide multiple text messages from its buffer to the conference. This can allow text messages to get through topically, that is, in response to a certain topic of the moment and not be handicapped by always lagging the flow or conversation. The limited number sent can prevent the text messages from dominating the conference while allowing adequate latency in taking the floor. In certain embodiments, the BUS 902 can empty its buffer of all incoming text messages. These preferences can be fixed in certain embodiments or selected either as a system property for all conferences or on a conference by conference basis.

Speech participants 108 in a conference have several mechanisms by which they can signal that they wish to have the floor and to request that a current speaker yield to them. They can make a quiet comment that does not interrupt the current flow but indicates their interest in making a comment. Some embodiments can make similar provisions for text messages.

The length of the queue of text messages waiting for conversion to be speech can be monitored and if it becomes greater than a certain value (for example, 5 texts), then a tone, whisper announcement or other audible indication can be injected into the speech conference. This audible indication can be repeated and repeated with greater frequency if the text queue does not drop below the defined value. In one embodiment, the time stamp of the text waiting at the head of a queue can be used as an alternative or in conjunction to the queue length indication. The audible indication of texts requesting the floor and the period that they have been in queue can be given.

In the flow of certain conferences, texts can be sent which become out of date or otherwise irrelevant. The conference can have moved on and presenting the text would be distracting. Speech participants 108 have the ability to reconsider points that they wish to make so as to similarly not disrupt a conference. Therefore, in certain embodiments, text messages can contain an identifier. This identifier can be unique to the message or be the identifier of the sending participant 108. A protocol can be supplied with such an embodiment in which an incoming text can be used as a control text to indicate the conference how certain texts should be handled. Control text can, for example, specify that the communications should be provided in text only or voice only. It can also be used to determine which participants 108 should receive the communications. These control texts can be identified by certain strings of characters not found in normal texts. They can contain control codes. One such control can instruct the MMCU 100 to remove all texts from the sending participant from the queue. Another control can instruct the MMCU 100 to remove a specified text message from the queue. These control codes can be placed in text messages to the conference manually by the sender or clients can have the capability of entering them automatically upon indication by the sending participant 108.

In the event that a silence "gap" is not available for a specific period of time, a method for interjecting speech derived from the text can be used. Otherwise the conversation might have moved on to a different topic. A question asked minutes ago, for example, about an old topic can derail the conversation's flow and in turn make it circular. This interjection can be implemented in several ways. A tone or beep which increases in intensity can indicate incoming speech converted from the text. The speech can be followed by the user's name and their message. The intensity of the tone or beep can be provided up to a level or to the level of energy as the current speaker.

On a similar note, it might be useful for a participant 108 to withdraw a pending text interaction. Depending on how much time has elapsed, for example, a question might have already been answered. On the client, this option can be presented as an un-send or delete action. In one embodiment, this can include a special text command.

As shown in FIG. 3, two forms of text signals 310 and 312 can be created by the MMCU 100. Participants can request to receive texts sent to the conference as a pure stream 310 or they can wish to have the conference texts and as well the text contributions embedded with the conference voice contribution 312. Thus in the TEV (text embedded voice) output 312, participants 108 who request this output can see all texts plus the primary speaker contribution converted to text.

FIG. 11 is a flow chart showing illustrative procedures for text media creation (text and voice-embedded voice) through the MMCU 100 in accordance with one or more aspects of the present disclosure. The processes can begin at block 1100. At block 1102, received text messages from participants can be accepted by the BUS 902 of FIG. 9. The BUS 902 can hold them in a queue until the appropriate time to play them as voice contributions at block 1104. At that time, the selected text can also be passed to the output text buffer (OTB) 904 at block 1106. The OTB 904 can then forward them to participants 108 who have requested it as text messages from the conference at block 1108. The effect of this is that the text message and its converted voice version can be sent to participants requiring them at the same time. The processes can end at block 1110. The flow of the conference can be maintained between text and voice. The voice version can contain an indication of whom the current text is from (from the sender name in the text message and their preferred name from the shared memory) so that receiving participants (or their clients) can identify contributions according to the specific sender.

The creation of texts from voice contributions can be accomplished by the TEV 336 component of FIG. 4. The CU 406, as described above, can generate a stream including the voice of the primary speaker. This stream can be passed to a streaming speech recognizer of conventional design on the voice-to-text element 340. The recognizer can be automated such that it is an automated speech recognizer (ASR). The output of the steaming ASR can be passed word-by-word to the TEV Generator 336. The TEV Generator 336 can assemble these words into text messages. The text message can be identified with the preferred name of the speaker whose identity has been determined as the primary speaker by the VAD 408.

Other required information such as time stamps containing the current time of day can be added as required. The text messages can be sent to the OTB 904 of FIG. 9, where they can be sent to all participants in the conference who have requested them. In addition to the conference streams described above, the CU 406 can produce a voice stream that contains the conferenced voice media from the primary participant. That is, it can consist of a stream of the largest samples from the conference.

Over the course of the conversations provided above, a wealth of information can be provided. As shown in FIG. 1, the MMCU 100 included an archive 106, which was shown as a database 214 in FIG. 2. The archive 106 can be distributed among a number of databases or be separated by logical connections. Communications and data stored within the archive 106 can be annotated, extracted and searched. This can be used for archiving purposes as described below. The pure voice 306, the voice embedded with text 308, text 310 and text embedded with voice streams 312 can be created in such a manner to allow the creation of time stamps for archiving purposes. The components creating these streams can supply these in such a manner as to be suitable to transfer to an archive 106.

The voice time stamps can be created from the time stamps used in the RTP streams on which they can be encoded. The text streams can be sent in a time stamped IM. As well, information such as the identity of the user submitting an interaction (voice or text) to the conference can be stored in the archive as well. These can be sent to an archive 106 where they can be stored and made accessible for later use. These uses can include both presentation of participants 108 and other end users. The archives 106 or selections from the archives 106 can be provided to other applications. A non-limiting example of such further uses of the archive 106 would be to bring context to a phone call regarding a past conference. The ability to search a conference for information and bring that into context for an email, phone call, etc. Furthermore, information about when a specific participant 108 entered into the conference can be kept tracked of. The specific conference interactions within the archive 106 can be indexed and searched by time stamps, sending user, etc.

Archived material from the stored streams relating to a conference can be made available in a number of clients. The provision of time stamps and use of information for interactions can allow the presentation of conference interactions in any of several manners. An illustrative non-limiting example of such a client is one which can present the conference, both voice and text interjections, in a text format. Individual speech interjections can be marked with a special indication that can allow this to be played as audio. This can allow the accessing party to hear the tone and inflection of a speaker's voice to resolve levels of ambiguity or to resolve issue in speech to text conversion.

Some embodiments of the archive 106 can allow for the searching and the presentation of the system by time, speaker or keyword. For example, a search might request the interactions from a specific user within a specific time interval. This could be presented as text results. Options can be presented to expand the results by showing conference activity before and or after one or more of the discovered interactions. Similarly, the text 310 and text with embedded voice 312 within the archive 106 can be indexed by keyword with the ability to search on keyword or combinations of keywords provided. So queries could ask for occurrences in which a specific user or group of users used certain keywords in a certain time interval.

Some clients can have the capability of presenting the conference as real time streams in either or both voice or text media. Such clients can present the conference as a running stream with some embodiments allowing the user to have CD like controls to play, pause, fast forward or reverse the playing of the conference. Some clients can allow certain forms of annotation to files of the conferences. With such clients, users can be able to indicate specific interactions, time periods containing interactions, etc. and create a voice or text annotation for this. These annotations can be stored in archives 106 associated with the conference or kept separate from the conference in storage associated with a single user or group of users.

Some embodiments can allow annotations to be played or displayed in conjunction with a conference in either or both of the real time or static displays described above. The annotations can be presented simultaneously with the conference as commentary on its interactions. Annotation fields can be indexed and searched with results from them presented either separately or in conjunction with their associated portions of the conference. In some embodiments annotations can be marked with indications of the participants 108 who are allowed to see them. That is, certain annotations could be kept private for the purposes of one participant 108 or a specified group of participants 108. This can be of use in interactions between companies in negotiation or in an automatic call distributor (ACD) environment in which a customer can interact with an ACD agent Certain embodiments can allow users to add annotations to a conference during the conference itself. Thus, for example, a client can allow a user to annotate a current interjection (speech or text) and have this stored in an annotation file associated with the conference. These can be sent to an archive 106 for future use. However some embodiments can allow for an annotation stream that can be made available to clients during the conference itself. These annotations can be private or public as described above. Certain embodiments can allow for access to archive files during an active conference. Thus, for example, a client could allow for a recap of recent or otherwise specified voice interjections.

In some embodiments, archives 106 can be selected and presented based on various criteria. Among such criteria can be a current topic which could be supplied to the conference by a participant 108 of system managers. With this, particular discussions within an ongoing conference can be identified and archives 106 related to them extracted and presented. Other criteria for the selection of material can include the name or affiliation of a participant 108. Tags can also be placed within the conversation when multiple subjects are being discussed. These tags can help facilitate the search. By way of a non-limiting example, two topics between participants 108 can be tagged as such and searched later on. These criteria can be combined with various forms of operators. So for example, the contributions of participant Date 108D about a topic "Budget" on Feb. 3, 2012 can be extracted and presented. Another example can be contributions from all participants 108 affiliated with a corporation about Project 3499. These extractions can be made available for use in other applications as well as being presented to a participant 108 or other end user. Extractions can be provided to detail summaries, emails, reports, phone calls, video calls, further conferences and other entities.

Some embodiments can offer the capability to extract material from multiple conferences. So, for example, search criteria can be all contributions from participant Date 108D regarding topic "Budget 3499" or "Topic Trade Show" with a date prior to "Feb. 3, 2012".

As indicated above, conferences can be terminated if all members leave the synchronous or voice conference. However in some embodiments conferences can persist until they are explicitly terminated by a participant 108 or system manager command. In such embodiments, conferences can last for prolonged periods of time with specific synchronous (e.g. voice, video etc) conferences arising as necessary. In such ongoing conferences, archives 106 can be delimited by indications such as date, participant's name, participant's affiliation of any other such criteria as considered useful.

FIG. 12 is a screen shot 1200 providing an exemplary scenario described with the MMCU 100 in accordance with one or more aspects of the present disclosure. The purpose of this example is to demonstrate the working of elements previously described and to bring in new elements that are better shown by way of an example. This client can contain the text version of participant 108 contributions received both in text and voice. The example assumes the same participants 108 with the same devices 110 as shown in FIG. 1. Apple 108A has a text input and display device 110A and a voice device 110A. This can be a telephone 110A and a personal computer 110A. Corn 108C has a text input and display device 110C but no voice device. Date 108D has a voice device 110D with a display on which text conferences can be displayed. These devices 110 can correspond to Corn 108C having a tablet computer 110C and Date 108D having a digital display telephone 110D.

To begin the example, Apple 108A can have a coordinating project manager for a project termed "3499". New requirements for 3499 have been received from senior management and Apple 108A and the other managers concerned with 3499 are dealing with them. An ongoing conference to deal with 3499 issues has been set up. Thus the conference has been entitled "Project 3499 Managers Conference". Apple 108A can determine that the process is far enough along that the budget for 3499 can be reevaluated and the necessary changes made. Apple 108A can bring up he can wish to make a quick suggestion to the group and for convenience wishes to do it by voice. She can also join the voice conference by calling the access number that has already been provided. She can have this on a convenient speed dial key. Alternatively, she can use the voice control that is shown on the conference tool bar.

By activating this control, her computer can trigger a behavior on an associated private branch exchange (PBX) which can connect her telephone to the voice portion of the 3499 conference. Note, that Apple's 108A telephone need not be terminated on the associated PBX. She can have registered the directory number of her telephone with the MMCU 100 and the PBX can connect her telephone to the conference by means of a standard blind transfer. That is, it can call both numbers and connect them together. Apple's 108A telephone rings and she can pick it up and quickly deliver her message recommending action of the budget issues as shown at the beginning of the conversation shown in the screen shot 1200.

At the conference, Apple's 108A voice stream can be received. It is conferenced with the other voice streams and sent to other participants 108 in both voice and text formats as described above. Apple's 108A message can be placed in a VET GUI. The message along with the time when it was received can be displayed along with an identifier for Apple 108A as shown. A small telephone icon 1202A can be displayed to inform participants that this originated as a voice interaction as well as a control so that the message can be played as voice over a device 110A.

Corn 108C is travelling and not in the office. However, he sees the 3499 conference discussions as important and has set up an alert to be notified of any interactions as they occur. Alerts can be set up using the alert control on the control bar. Alerts can be set on interactions in groups or specific conference. Alerts can be based on keywords such as contributions with the word "budget", certain people such as the group leader or scheduler. Alerts for all conferences can be set up in a control GUI for the MMCU 100 or from a specific conference using the control shown on the tool bar.

The word budget in Apple's 108A contribution can trigger the alert set by Corn 108C and an alert indication is sent to Corn's 108C computer 110C which he has registered as active for use of the conference. The alert indication can be audible or visible. It can consist of a tone and/or a flashing icon 1202C. It can operate by automatically bringing the VET window up on Corn's 108C screen. Options can be provided to indicate user preferences on the form of alerting.

Corn 108C can be alerted and wish to contribute to the conference with a suggestion that the matter be urgently taken up. Embodiments can include the text control seen on the tool bar of the screen shot 1200 of FIG. 12. Activating the control can open another window or extend the window with an input text GUI. The window can contain a text box and various controls by which desired text messages can be entered, edited and sent to the conference. Among the controls in this window is one indicating the relative importance of the message and one for adding appropriate fields as attachments to the message. Some embodiments can detect important messages. A display of emotion such as high pressure on keyboard keys, use of capitals, loud voice or certain words can be used as this indication and marked with the appropriate indicator.

Corn 108C can enter his desired message to provide his suggestion that the discussion of the budget go ahead. He then can activate the attachment control 1204 which opens a window by which he can specify the file that he wishes attached. He attaches a file containing a draft budget proposal. To show the importance with which he regards the message, he activates the importance control which can provide a pull down menu where he can select indications of that importance or some other means of selection. He can select the message as important and a control sequence indicating this is entered into the message. Corn 108C can then select a send control and the message is sent to the conference. The extension is converted to voice and played to the other current voice participants 108. The message can be sent as text to the archives 106 and appropriate streams.

Corn's 108C message can be shown in the VET display of the screen shot 1200. It is shown with time stamps indicating the times that it was sent and an identifier for Corn 108C. Since the message was marked by another participant 108 as important, the message text can be displayed in a bold font to indicate this, not shown. Other indicators such as text color, underscoring, types of fonts and special icons can also be used. An icon 1202C showing three horizontal lines to the left of the message can represent lines of text on a page and identifies this message as originating from a text source.

Since Corn 108C has replied immediately, Apple 108A is still connected to the conference though a voice connection. She replies by voice to agree and indicates that she would like to go ahead if Date 108D is available. A reply is sent to both voice and text participants 108 and is shown displayed on the VET display of the screen shot 1200. The synthetic voice which can be used to present the text message to the conference can be selected on various criteria. Since Corn 108C has indicated the message as important, it can be presented in a distinct authoritative tone. An ordinary interaction can be presented in a flat tone. A quiet message can be provided in an unobtrusive whisper. Voices can also be selected according to other factors such as the gender of the sender. In some embodiments, different voices can be used as an aid in differentiating between the interactions of text participants 108.

Continuing with the example, Date 108D can be away from her device 110D but can return several minutes later. She can see the discussion on the display of her digital telephone 110D. Date 108D can supply only voice input to the conference and join to the conference using the voice control indicated by her icon 1202D. She can send a message that she is available. This can be presented to participants 108 in both voice and text. Apple 108A has left the voice portion of the conference but notices Date's 108D reply several minutes later and decides to reply by text to suggest that the budget discussion carry on immediately. Both Corn 108C and Date 108D can see this on their displays.

One of the participants 108 has decided to annotate Corn's 108C message to add some comments about the budget process. The participant can use the attachment control on the tool bar to open a text interface where this can be entered. The annotation can be associated with the message in the archives 106. It can be indicated by the pointing hand icon 1206 placed on the text of Corn's 108C message.

Participants 108 can also search the discussion using various criteria through the search control in the tool bar. The example, provided above, can show the types of interactions that are enabled by multi-modal conferencing. An ongoing conference is shown that has been set up to facilitate the collaboration of a group of managers about factors that concern a certain topic. Participants 108 can share information even if they are not continually present and to initiate and participate in highly interactive discussions independent of the specific capabilities of their devices. Participants 108 can come and go and are enabled to remain aware of the interactions in the conference while being allowed to prioritize their attention to meet their own specific needs.

The mechanisms described above can be used for handling modalities between the participants 108 connected to the MMCU 100. A list of how each mechanism was used is described below:

(a) Turn Taking—Vocals clues taken from the voice stream are used to synchronize interjections. Provisions to allow timely insertion of text material into a conference were introduced;

(b) Conference Identification—A specific conference identifier can be provided. This can be used to access archived material and for display in clients to allow a user to take part in multiple conferences simultaneously;

(c) Participant Identification—Voice media can be identified by either user voice or by specific identification of interjections converted from speech. Text interjections can be identified as coming from specific users;

(d) Ordering of Interjections—Synchronization provided by turn taking mechanism derived from vocal cues allows text messages to be ordered properly within the conference;

(e) Modulation of Meaning—Allowing for archived presentation of text from voice with the option of hearing the voice to determine inflection, etc.;

(f) Expectation of Shared Awareness—Ability to have text display associated with the conference. This can provide a running history during the conference which can allow a user to review interactions that occurred when their attention was diverted. This can provide the ability to have a vocal recap during the conference; and (g) Floor Domination—Ability to limit the number of text messages to be played at one time.

Those features and functions described above can be used in an ACD environment. By way of a non-limiting example, a caller can open a multi-modal session with an agent and retain a record of what has transpired so that an ongoing interaction can be set up. This can extend the current offers of social media technology in ACD by allowing ongoing interactive ACD interactions. It can offer new possibilities for customer benefit there. With an ongoing interaction, past interactions with the caller are held in the archive 106 and can be referenced by the agent and the caller. The agent can publicly and privately annotate. Public annotation can provide clarification and updates for the caller or agent while private annotations can be used specifically for the purposes of the agent.

In certain embodiments, video can be received and distributed by the MMCU 100. Certain devices 110 can be enabled to send and/or receive video from a conference that can be negotiated during participant connection to a conference through the SI 402. Video provided by the MMCU 100 to participants 108 requesting it can be of several forms. In a particular example, the presented video can be selected using the speaker selection mechanisms provided in the voice conference unit. This video, if any, can be provided from that participant 108 to all video receiving participants 108 along with an embedded textual identification of him/her. In other embodiments, video images of participants 108 can be provided as a mosaic of images, or other display technique, with the video of the current speaker identified by changing the color, width, intensity etc. A surrounding border, with increasing size, can be presented in a reserved primary speaker box or by some other suitable display. In certain embodiments, participants can selectively be presented with the video images from certain participants 108 or a group of certain participants 108. In some embodiments participants 108 can be informed of the identity of participants 108 that are viewing their video and can, also, be provided with methods whereby they can prohibit certain participants 108 or groups of certain participants 108 from viewing their video feed.

The technology described herein can be implemented as logical operations and/or modules. The logical operations can be implemented as a sequence of processor-implemented steps executing in one or more computer systems and as interconnected machine or circuit modules within one or more computer systems. Likewise, the descriptions of various component modules can be provided in terms of operations executed or effected by the modules. The resulting implementation is a matter of choice, dependent on the performance requirements of the underlying environment in which the described disclosure is implemented. The logical operations making up the embodiment of the disclosure described herein are referred to variously as operations, steps, objects, or modules. It should be understood that logical operations can be performed in any order, unless explicitly claimed otherwise or a specific order is inherently necessitated by the claim language.

Various embodiments of the present disclosure can be programmed using an object-oriented programming language, such as SmallTalk, Java, C++, Ada, or C#. Other object-oriented programming languages can also be used. Alternatively, functional, scripting, and/or logical programming languages can be used. Various aspects of this disclosure can be implemented in a non-programmed environment, for example, documents created in HTML, XML, or other format that, when viewed in a window of a browser program, render aspects of a GUI or perform other functions. Various aspects of the disclosure can be implemented as programmed or non-programmed elements, or any combination thereof.

In software implementations, computer software and/or data is stored on a machine readable medium as part of a computer program product, and is loaded into a computer system or other device or machine via a removable storage drive, hard drive, or communications interface. Computer programs, also called computer control logic or computer readable program code, are stored in a main and/or secondary memory, and executed by one or more processors, controllers, or the like to cause the one or more processors to perform the functions of the disclosure as described herein.

The figures and examples above are not meant to limit the scope of the present disclosure to a single embodiment, as other embodiments are possible by way of interchange of some or all of the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present disclosure, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A method of connecting participants into a multi-modal conference comprising:
   receiving at least one of an incoming audio signal and incoming text-based message;
   when an incoming audio signal is received, transcoding the incoming audio signal to a text-based message, interleaving the text-based message with other incoming text-based messages and providing the interleaved text-based messages to at least one participant having a text-based receiver connected into the multi-modal conference; and
   when an incoming text-based message is received, transcoding the incoming text-based message to an audio signal and providing the audio signal to at least one participant having an audio-based receiver connected into the multi-modal conference based on a plurality of mechanisms, the plurality of mechanisms comprising: when an idle period is present within voice communications on the multi-modal conference unit, turn taking, conference identification, participant identification, ordering of interjections, modulation of meaning, expectation of shared awareness, floor domination and combinations thereof.

2. The method of claim 1, wherein receiving the at least one of the incoming audio signal and incoming text-based message comprises acquiring both the incoming audio signal and incoming text-based message through a transmitter connected into the multi-modal conference.

3. The method of claim 2, wherein providing the interleaved text-based messages to the at least one participant having the text-based receiver and providing the audio signal to the at least one participant having the audio-based receiver connected into the multi-modal conference comprises establishing semi-synchronous communications within the multi-modal conference.

4. The method of claim 1, wherein transcoding the incoming audio signal to the text-based message comprises creating an identifier of a participant providing the incoming audio signal and announcing the identifier with the text-based message.

5. The method of claim 1, wherein transcoding the incoming text-based message to the audio signal comprises creating an identifier of a participant providing the incoming text-based message and announcing the identifier with the audio signal.

6. The method of claim 1, comprising at least one of ordering of idle period present within voice communications on the multi-modal conference unit, interjections, modulation of meaning, expectation of shared awareness and floor domination.

7. The method of claim 1, comprising creating a unique identifier and media negotiation address for the multi-modal conference and notifying potential participants of the unique identifier and media negotiation address.

8. A system comprising:
   at least two receivers operating with different modalities connected to a conferencing appliance, wherein the conferencing appliance merges the modalities from the at least two receivers by executing a plurality of mechanisms, the plurality of mechanisms comprising: turn taking, conference identification, participant identification, ordering of interjections, modulation of meaning, expectation of shared awareness, floor domination and combinations thereof.

9. The system of claim 8, wherein turn taking comprises converting incoming audio to text, waiting for an idle period within other incoming texts, interleaving the text with the other incoming texts and providing the interleaved texts to at least one text-based receiver connected to the conference appliance and converting incoming text to audio, waiting for an idle period and providing the audio to at least one audio-based receiver connected into the conference appliance.

10. The system of claim 8, comprising a sample switching conference unit, the sample switching conference unit receiving audio streams from the at least two transmitters, comparing the audio streams and selecting a largest sample of the audio streams whereby an audio stream associated with the largest sample is provided to participants of the at least two transmitters connected into the conferencing appliance.

11. The system of claim 10, where a second largest sample is provided to a participant if the participant made the largest sample.

12. The system of claim 8, wherein the conferencing appliance stores communications in both text and audio within an archive.

13. The system of claim 12, wherein the communications within the archive can be annotated, extracted and searched.

14. The system of claim 8, wherein at least one document is attached to conversations supported by the conferencing appliance.

15. The system of claim 8, wherein the at least two receivers interact through a second level of communication which is managed by the conference appliance.

16. The system of claim 15, wherein interaction through the second level of communication comprises at least one of presentation of identifying information of participants who are viewing at least one video feed and control of access to the at least one video feed available to at least one participant.

17. A multi-modal conference unit comprising:
- at least one processor; and
- a memory operatively coupled to the processor, the memory storing program instructions that when executed by the processor, causes the processor to:
  - receive at least one text-based message from a participant;
  - buffer the at least one text-based message in a queue;
  - transcode the at least one text-based message to an audio signal; and
  - placing the audio signal on at least one outgoing link connected to a participant based on a plurality of mechanisms, the plurality of mechanisms comprising: when an idle period is present within voice communications on the multi-modal conference unit, turn taking, conference identification, participant identification, ordering of interjections, modulation of meaning, expectation of shared awareness, floor domination and combinations thereof.

18. The multi-modal conference unit of claim 17, wherein the memory storing program instructions, when executed by the processor, causes the processor to determine a primary speaker within the voice communications.

19. The multi-modal conference unit of claim 17, wherein the memory storing program instructions, when executed by the processor, causes the processor to provide whisper announcements if a number of text-based messages exceeds a defined threshold within the queue.

20. The multi-modal conference unit of claim 17, wherein the memory storing program instructions, when executed by the processor, causes the processor to remove text-based messages provided by a participant if a control code is received by the multi-modal conference unit.

* * * * *